US009088787B1

(12) United States Patent
Smith et al.

(10) Patent No.: US 9,088,787 B1
(45) Date of Patent: Jul. 21, 2015

(54) SYSTEM, METHOD AND COMPUTER SOFTWARE PRODUCT FOR PROVIDING VISUAL REMOTE ASSISTANCE THROUGH COMPUTING SYSTEMS

(71) Applicant: Lockheed Martin Corporation, Bethesda, MD (US)

(72) Inventors: David Alan Smith, Cary, NC (US); Gregory A. Harrison, Oviedo, FL (US); Hasan Schwandes, Orlando, FL (US); Patrick J. Goergen, Orlando, FL (US); Danielle Holstine, Orlando, FL (US); Eric Sorokowsky, Winter Springs, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 85 days.

(21) Appl. No.: 13/841,750

(22) Filed: Mar. 15, 2013

Related U.S. Application Data

(60) Provisional application No. 61/682,758, filed on Aug. 13, 2012.

(51) Int. Cl.
*G06K 9/00* (2006.01)
*H04N 13/02* (2006.01)

(52) U.S. Cl.
CPC ....... *H04N 13/0278* (2013.01); *H04N 13/0275* (2013.01)

(58) Field of Classification Search
None
See application file for complete search history.

(56) References Cited

U.S. PATENT DOCUMENTS

| 8,264,494 | B2 | 9/2012 | Kilani et al. | |
| 2002/0167536 | A1 | 11/2002 | Valdes et al. | |
| 2007/0064098 | A1 | 3/2007 | Tran | |
| 2013/0141421 | A1* | 6/2013 | Mount et al. | 345/419 |

OTHER PUBLICATIONS

Perez-Marcos, Daniel, et al. "A fully immersive set-up for remote interaction and neurorehabilitation based on virtual body ownership." Frontiers in neurology 3 (2012).*
Palmer, Doug, et al. "Annotating with light for remote guidance." Proceedings of the 19th Australasian conference on Computer-Human Interaction: Entertaining User Interfaces. ACM, 2007.*

(Continued)

*Primary Examiner* — Nirav G Patel
(74) *Attorney, Agent, or Firm* — Withrow & Terranova, PLLC

(57) ABSTRACT

A system a 3D scanning device located at a first location configured to capture information for a 3D model of an object, a first computing system located at a second location configured to provide for an annotation of an augmented reality image on the 3D model, a second computing system located at the first location configured create the 3D model and to illustrate the annotation of the augmented reality image or the annotation of the augmented reality image on the 3D model created at the second location, and a communication protocol configured to communicate the 3D model and the augmented reality image between the first computing system and the second computing system. A method is disclosed. A non-transitory processor readable storage medium, providing an executable computer program product, the executable computer program product comprising a computer software code when executed causes a processor to perform certain functions is also disclosed.

18 Claims, 11 Drawing Sheets

(56) References Cited

OTHER PUBLICATIONS

Minatani, Shinya, et al. "Face-to-face tabletop remote collaboration in mixed reality." Proceedings of the 2007 6th IEEE and ACM International Symposium on Mixed and Augmented Reality. IEEE Computer Society, 2007.*

Michael Kleiber ; Bastian Weltjen ; Julia Förster; Stereoscopic desktop VR system for telemaintenance. Proc. SPIE 8288, Stereoscopic Displays and Applications XXIII, 828803 (Feb. 9, 2012).*

Author Unknown, "Xtion PRO: Use Xtion PRO developer solution to make motion-sensing applications and games," Product Overview, ASUSTeK Computer Inc., Retrieved Nov. 14, 2014, http://www.asus.com/Multimedia/Xtion_PRO/, 6 pages.

Pirovano, Michele, "Kinfu—an open source implementation of Kinect Fusion + case study: implementing a 3D scanner with PCL," Project Assignment, 3D structure from visual motion, University of Milan, 2011, http://homes.di.unimi.it/~pirovano/pdf/3d-scanning-pcl.pdf, 20 pages.

* cited by examiner

SYSTEM, METHOD AND COMPUTER SOFTWARE PRODUCT FOR PROVIDING VISUAL REMOTE ASSISTANCE THROUGH COMPUTING SYSTEMS

CROSS-REFERENCE TO RELATED APPLICATIONS

This application claims the benefit of U.S. Provisional Application No. 61/682,758 filed Aug. 13, 2012, and incorporated herein by reference in its entirety.

BACKGROUND

Embodiments relate to a communication system and, more particularly, to providing visual assistance to a user at a first location from an assisting user at a second location.

Various types of computing systems using displays are known. Examples include, but are not limited to desktop computers, smart phones, tablet computers, laptop computers, head mounted systems, etc. A head wearable display ("HWD") device, such as a helmet-mounted display or eyeglass-mounted display, is worn on the head of an individual that has one or more small display devices located near one eye or, more commonly, both eyes of the individual, user, or wearer. The HWD device may be monocular (where one eye has a view screen), biocular (where both eyes see the same scene on the same screen), or binocular (where each eye has an individual view screen).

Some HWD devices only provide for simulated (computer-generated) images, as opposed to real-world images and, accordingly are often referred to as "virtual reality" or immersive devices. Other HWD devices, typically those which are a part of a head mounted display ("HMD") system, superimpose (combine) a simulated image upon a non-simulated, real-world image. The combination of non-simulated and simulated images allows the user or wearer of the HWD device to view the world through, by way of a non-limiting example, a visor or eyepiece through which additional data relevant to the task to be performed may be superimposed onto the forward field of view (FOV) of the user. This superposition is sometimes referred to as "augmented reality" or "mixed reality."

Combining a non-simulated, real-world view with a simulated image can be achieved using a partially-reflective/partially-transmissive optical surface (a "beam splitter") where the surface's reflectivity may be used to display the simulated image as a virtual image (in the optical sense) and the surface's transmissivity may be used to allow the user to view the real world directly (referred to as an "optical see-through system"). Combining a real-world view with a simulated image can also be done electronically by accepting video of a real world view from a camera and mixing it electronically with a simulated image using a combiner (referred to as a "video see-through system"). The combined image can then be presented to the user as a virtual image (in the optical sense) by means of a reflective optical surface, which in this case need not have transmissive properties.

Currently, technology associated with combining the real-world view with a simulated image is still in its infancy. As such, though simulated images may be included on the real-world view, the sort of information which may be included is limited. Manufacturers and users of such technology would benefit from advances with computing systems where such systems may assist a user at a first location with a task, such as, but not limited to, maintenance, collaboration, or training by interacting with a second location with use of an augmented reality image of a subject object.

SUMMARY

Embodiments relate to a system, method and a computer program product for providing a remotely created augmented reality image which may be provided in a real-world view as seen through a head wearable display device where the image is relevant to the real-world view. The system comprises a 3D scanning device, located at a first location, configured to capture a 3D model of an object for collaboration, training or maintenance, and a first computing system, located at a second location, configured to provide for an annotation of an augmented reality image on the 3D model. The system further comprises a second computing system, located at the first location, configured to illustrate the annotation of the augmented reality image, or the annotation of the augmented reality image on the 3D model, created at the second location. The system also comprises a communication protocol configured to communicate the 3D model and the augmented reality image between the first computing system and the second computing system.

The method comprises capturing a three dimensional (3D) model of an object at first location with a 3D scanning device, and communicating the 3D model to a second location. The method also comprises annotating an augmented reality image on the 3D model at the second location with a first computing system, and communicating the annotated augmented reality image or the augmented reality image on the 3D model to the first location. The method also comprises displaying the annotated augmented reality image or the augmented reality image on the 3D model with a second computing system at the first location.

The computer program product comprises a non-transitory processor readable storage medium, providing an executable computer program product, the executable computer program product comprising a computer software code that, when executed by at least one processor, causes the at least one processor to capture a three dimensional (3D) model of an object at first location with a 3D scanning device, and communicate the 3D model to a second location. The processor is also caused to annotate an augmented reality image on the 3D model at the second location with a first computing system, and communicate the annotated augmented reality image or the augmented reality image on the 3D model to the first location. The processor is also caused to display the annotated augmented reality image or the augmented reality image on the 3D model with a second computing system at the first location.

BRIEF DESCRIPTION OF THE DRAWINGS

A more particular description will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1:
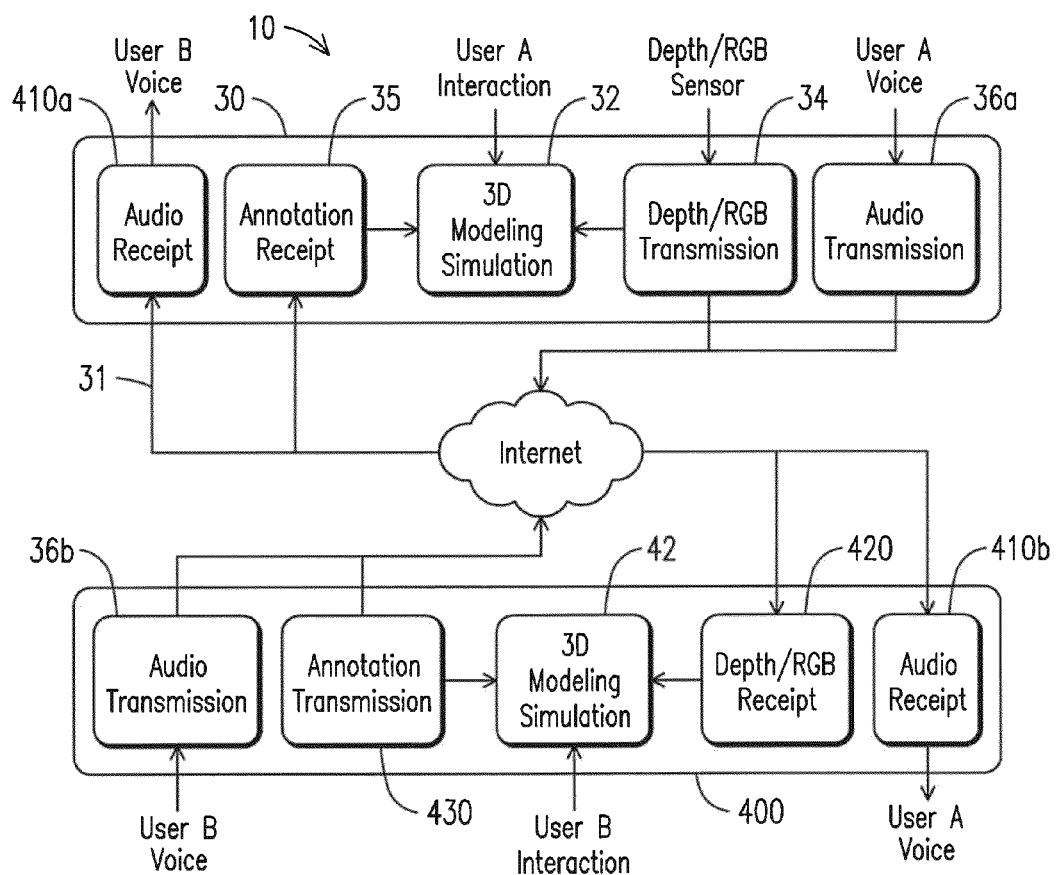
FIG. 1 shows a flow diagram for HWD remote assistant system for network-based collaboration, training and/or maintenance in accordance with an embodiment.

Embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The disclosed embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. As a non-limiting example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 6.

Though the embodiments herein specifically disclose a Head Wearable Display ("HWD") device, the embodiments are applicable to any computing system, such as, but not limited to, desktop computers, laptop computers, tablet devices, smartphones, provided that a recording depth sensor is also provided. Therefore, the use of the HWD device when explaining the embodiments herein should not be considered limiting.

A Head Wearable Display ("HWD") Remote Assistant System ("HWD-RAS") may be configured to provide an Augmented Reality ("AR") enhanced collaboration, maintenance or training by communicating instruction using an AR platform. The HWD-RAS may be configured to support maintenance, live training, battlefield awareness operations and/or collaborations between remotely located users. As disclosed above, a standard computer, such as, but not limited to desktop computer, laptop computer, tablet device, smartphone, etc., may also be used in place of the HWD device.

In an embodiment, the HWD-RAS may include an HWD device. The HWD device may include a Flat Lens Head Wearable Device (FLHWD) configured to overlay virtual images in the real world as seen by the human eye through a see-through flat lens. In an embodiment, the HWD device may be configured as a Curved Lens Head Wearable Device (CLHWD) configured to overlay virtual images in the real world as seen by the human eye through a see-through curved lens.

The HWD device may be configured to recognize real world objects, utilize its integrated software database, and three dimensional ("3D") model images without forcing a user to look through a camera. The HWD device may be a hands free device configured to expand the possibilities of Augmented Reality.

The HWD device may be configured to provide a first user, user A, a capability to see a real-world view and objects within a field of view (FOV) of see-through lenses. In an embodiment, the HWD device may be configured to provide user A the capability to see the real-world view and objects within the field of view (FOV) together with an AR overlay of annotations, free-form markings on the surface of the objects, text relative to a point on the surface of an object, and/or pre-defined shapes relative to a point on the surface of an object entered by a second user, user B.

FIG. 1 illustrates a flow diagram for HWD remote assistant system for network-based collaboration, training and/or maintenance in accordance with an embodiment. The diagram 10 has a plurality of parts, such as without limitation, an upper part 30 for the HWD device operations associated with User A, a middle section for communication, such as, but not limited to, the Internet or other networks, and a lower part 400 for a computing system associated with User B.

Figure 2:
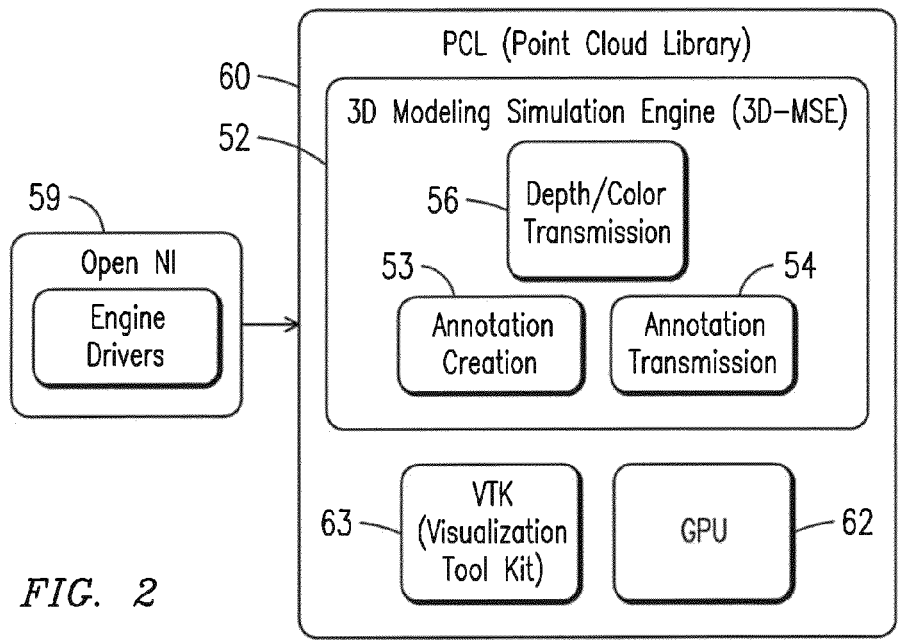
FIG. 2 shows a block diagram of a three-dimensional (3D) modeling simulation engine in accordance with an embodiment.

With reference to the upper part 30, the HWD device may be configured to receive audio or voice communications from User B at block "audio receipt" 410a and receive annotation at block "annotation receipt" 35. The block "annotation receipt" feeds into a 3D modeling simulation engine 32. Additionally, the HWD device is configured to perform depth/Red-Blue-Green ("RGB") sensing via a depth/RGB sensor of an object viewed by User A, depth/RGB transmission 34 to User B, and audio transmission 36a from User A to User B. The depth/RGB sensor provides raw color and depth date of an object at a certain level of discretization size, from which the 3D-modeling simulation engine (3D-MSE) 52 (as illustrated in FIG. 2 creates the 3D model. The depth/RGB transmission block 34 may communicate sensed depth/RGB data to the 3D modeling simulation engine 32. The depth/RGB transmission block 34 may include data associated with a 3D model of a real-world view of a scene through the lens of the HWD device 100 (as shown in FIG. 4). The scene may include at least one object. By way of a non-limiting example, a depth/RGB sensor 50 (illustrated in FIG. 3A) may include an ASUS® Xtion sensor.

With reference to the lower part 400, the HWD device 100 may be configured to receive audio or voice communications from User A at block "audio receipt" 410b and receive depth/RGB data from User A at block "depth/RGB receipt" 420 through the Internet or other network. At User B, the 3D modeling simulation engine 42 may process the depth/RGB data and display the 3D model of the real-world view of a scene observed by User A as represented in the depth/RGB data. The computing device, which may be a part of the modeling simulation engine 42, for User B may be further configured to receive annotations (e.g., annotations, free-form markings overlaid on the surface of the objects in said scene, text relative to a point on the surface of an object in said scene, and/or pre-defined shapes relative to a point on the surface of an object in said scene) entered by User B. The block 3D modeling simulation engine 42 in the lower part 400 may be configured to feed the annotations from User B into the block "annotation transmission" 430 wherein the entered annotations may be communicated through the Internet or other network to the HWD device and received by the annotation receipt block of part 30. In the lower part 400, audio transmission 36b of captured audio from User B may be communicated through the Internet or other network to the HWD device worn by User A.

FIG. 2 illustrates a block diagram of a three-dimensional (3D) modeling simulation engine (3D-MSE) in accordance with an embodiment. The 3D-MSE 52 may include an annotation creator 53, an annotation transmission assembler 54, and a depth/color transmission assembler 56. The sensor 50 communicates via an open-NI protocol 59, to a Point Cloud Database/processor 60. Open-NI stands for Open-source Natural Interaction. An interoperability application programming interface (API) may be used to read/process input from Depth/RGB sensor (and other natural interaction devices). A Point Cloud Library ("PCL") 60 may include a set of vertices in a 3-dimensional coordinate system, representing a set of points on the surface of a real-world object or scene.

In an embodiment, an open-source Library of Point Cloud and 3D Geometry Processing Services may be used. The PCL may include an open NI interface for RGB sensor input. The PCL may include low level processing (e.g., filtering, estimation, surface reconstruction, image/object registration, model fitting, and segmentation) and may include higher level tools for performing mapping and object recognition. The PCL comprises many algorithms for 3D processing, which are updated, improved, fixed, etc., in near real-time.

The 3D-MSE may include, by way of non-limiting example, KinFu by Microsoft® which is an open-source application configured to provide 3D visualization and interaction. The 3D-MSE may process live depth data from a camera/sensor and create a Point Cloud and 3D models for real-time visualization and interaction. A graphics processing unit (GPU) 62, such as by way of non-limiting example a CUDA graphics processing unit, may be used to execute the open-source application. A visualization tool kit 63 may be provided.

Figure 3A:
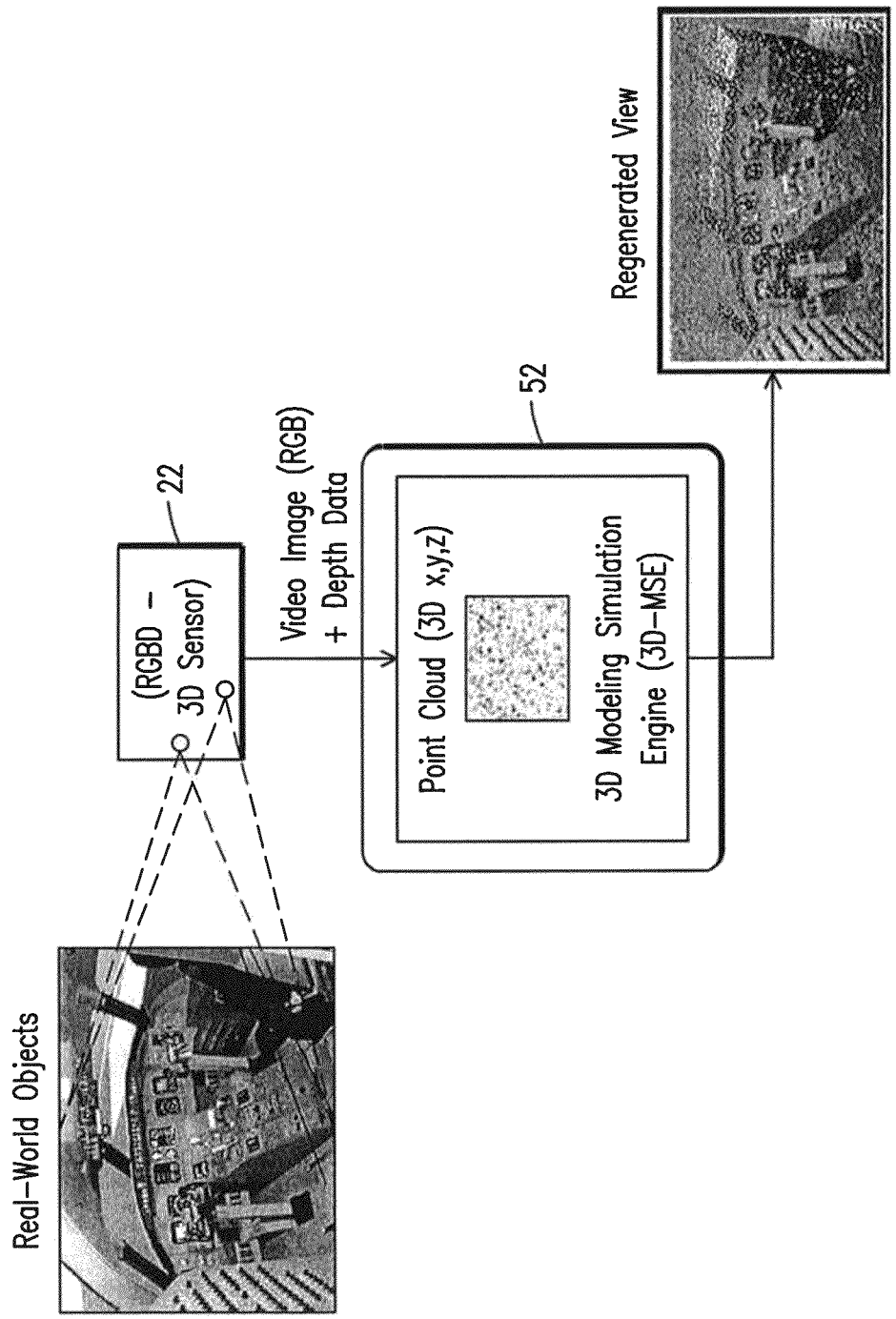
FIG. 3A shows a block diagram for generating a 3D model in an embodiment.

FIG. 3A illustrates a block diagram for generating a 3D model in an embodiment. In general, with respect to FIGS. 3A and 3B, an object may be sensed and a Point Cloud and resultant image may be created. By way of non-limiting example, a cockpit of an aircraft is in the real-world scene. The depth/RGB sensor 50 captures the real-world scene wherein a library with Point Cloud data (3D, x, y, z) is prepared and processed by the 3D-MSE 52 to create a resultant internal 3D model representation of the sensed scene. The scene is capable of being displayed as a two dimensional (2D) image, and rotated in 3D space to see other views of the scene.

Figure 3B:
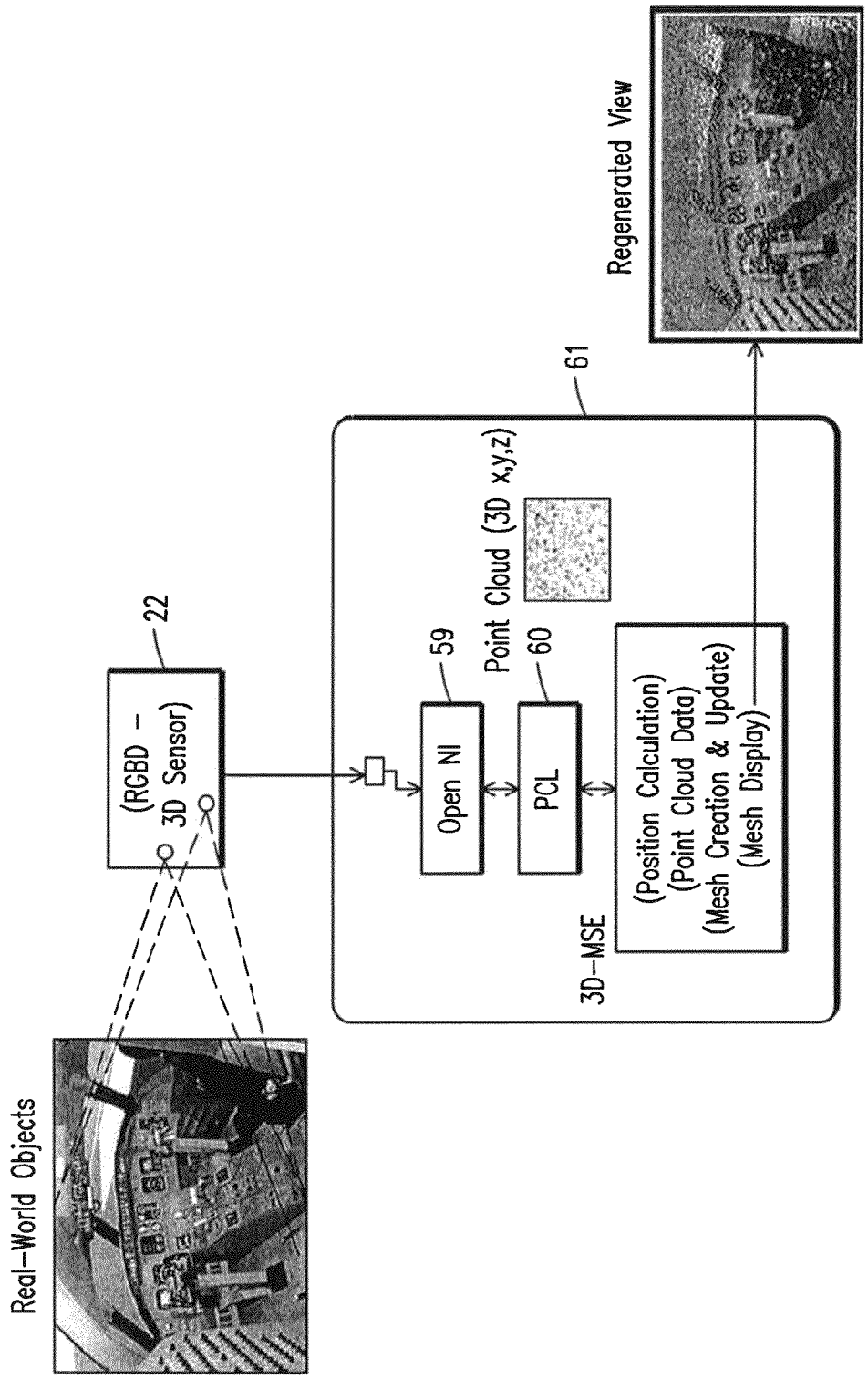
FIG. 3B shows a block diagram for generating a 3D model with one or more features of the 3D modeling simulation engine shown in accordance with an embodiment.

FIG. 3B illustrates a block diagram for generating a 3D model with one or more features of the 3D modeling simulation engine shown in accordance with an embodiment. Here the sensor data is sent to the Open NI 59 which is then sent to the PCL 60 for development of the Point Cloud data. The Point Cloud data is sent to the 3D-MSE 52 where position calculations may be performed. All of these components may be part of a computing system 61. Additionally, a mesh may be created and updated such that a mesh is displayed with the image representation of the 3D model.

Figure 4A:
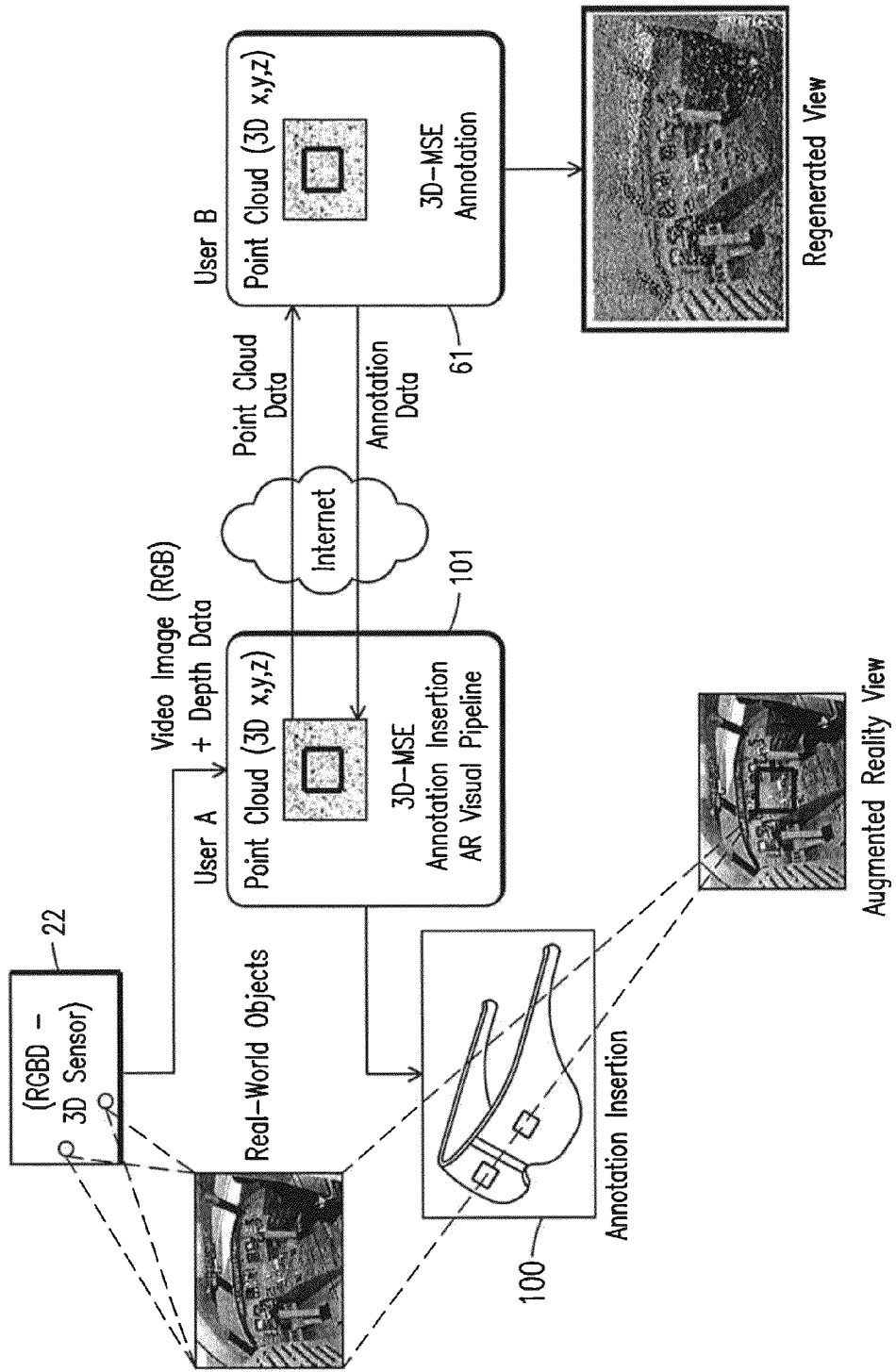
FIG. 4A shows a block diagram of an HWD remote assistant system in accordance with an embodiment.

FIG. 4A illustrates a block diagram of an HWD remote assistant system in accordance with an embodiment. The HWD device 100 is represented as the glasses. In an embodiment, an object or scene may be sensed with the sensor 22 and then Point Cloud data (local to User A) is developed, such as with an annotation insertion augmented reality visual pipeline which may be a computing system 101 either a part of the HWD device or attached to a user of the HWD device. The Point Cloud data may be for a particular frame. The Point Cloud data may represent a 3D model of a scene with objects. The Point Cloud data may be communicated for display by a computing device associated with User B. The computing device may be configured to receive annotation by User B. The annotations may be viewed in the scene (and associated Point Cloud data) on the display viewed by User B. The computing device associated with User B may include the 3D-MSE 52 for processing the Point Cloud data and generating the 3D model of the scene or resultant image for display. The 3D-MSE 52 may be configured to assemble the Annotation Data for transmission to the HWD device 100 and use in User A's Point Cloud data. The annotation represented by the annotation data is registered in the Field of View of the lenses associated with the HWD device 100 worn by User A and overlaid in the Field of View of the lenses at substantially the same location in the scene entered by User B. The Point Cloud data may be updated for each frame. In one embodiment, User A may be a technician and User B may be a subject matter expert (SME).

Figure 4B:
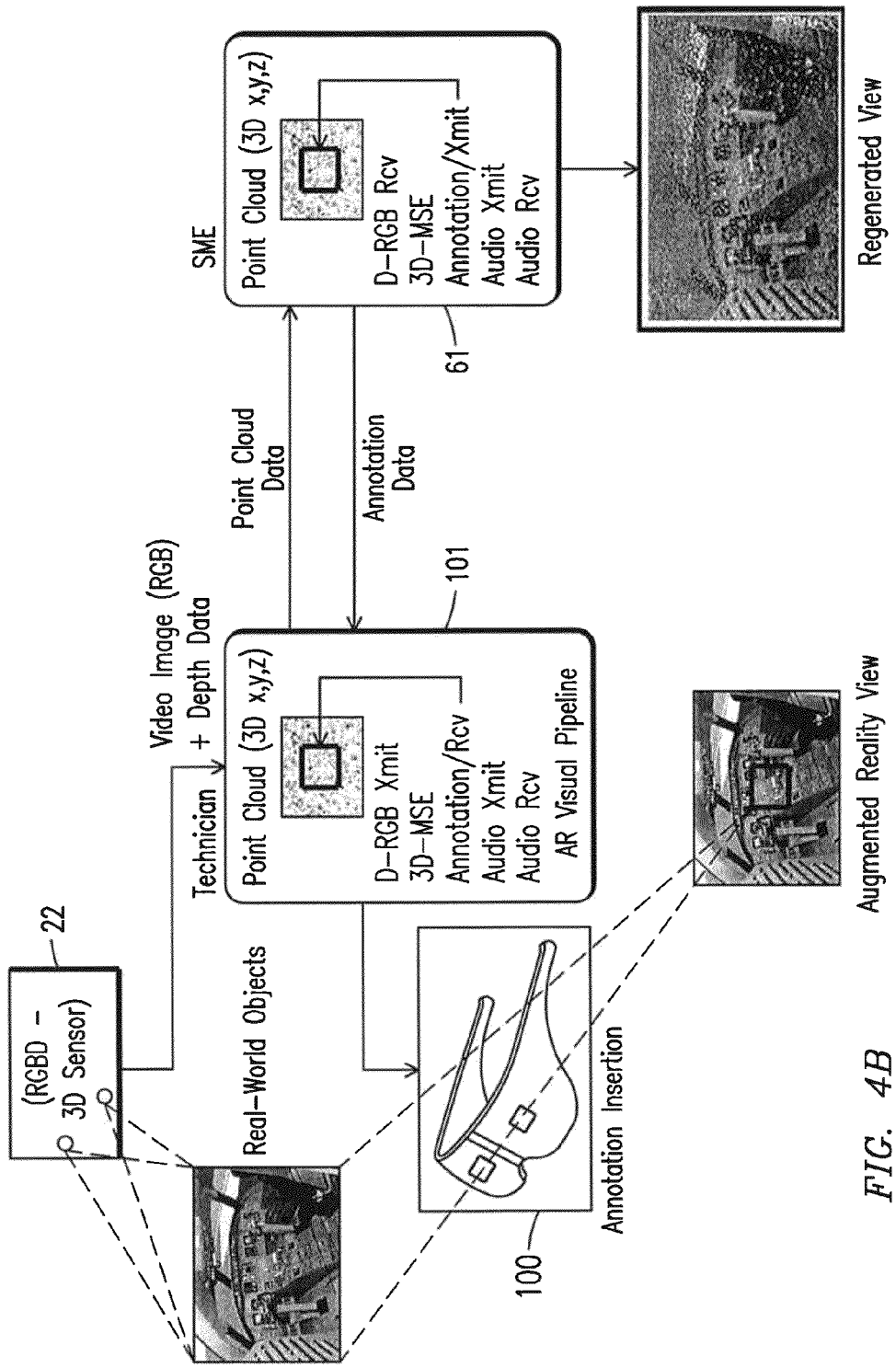
FIG. 4B shows a block diagram of an HWD remote assistant system with communication transfer in accordance with an embodiment.

FIG. 4B illustrates a block diagram of an HWD remote assistant system with communication transfer in accordance with an embodiment. In addition to providing visual views, a discussion may take place between User A and User B where User B may provide verbal remote assistance as User B is also able to view the objects as seen by User B. The audio receipt blocks 410a, 410b in FIG. 1 and Audio Transmission 36a, 36b of FIG. 1 may be utilized to provide this communication.

Figure 5:
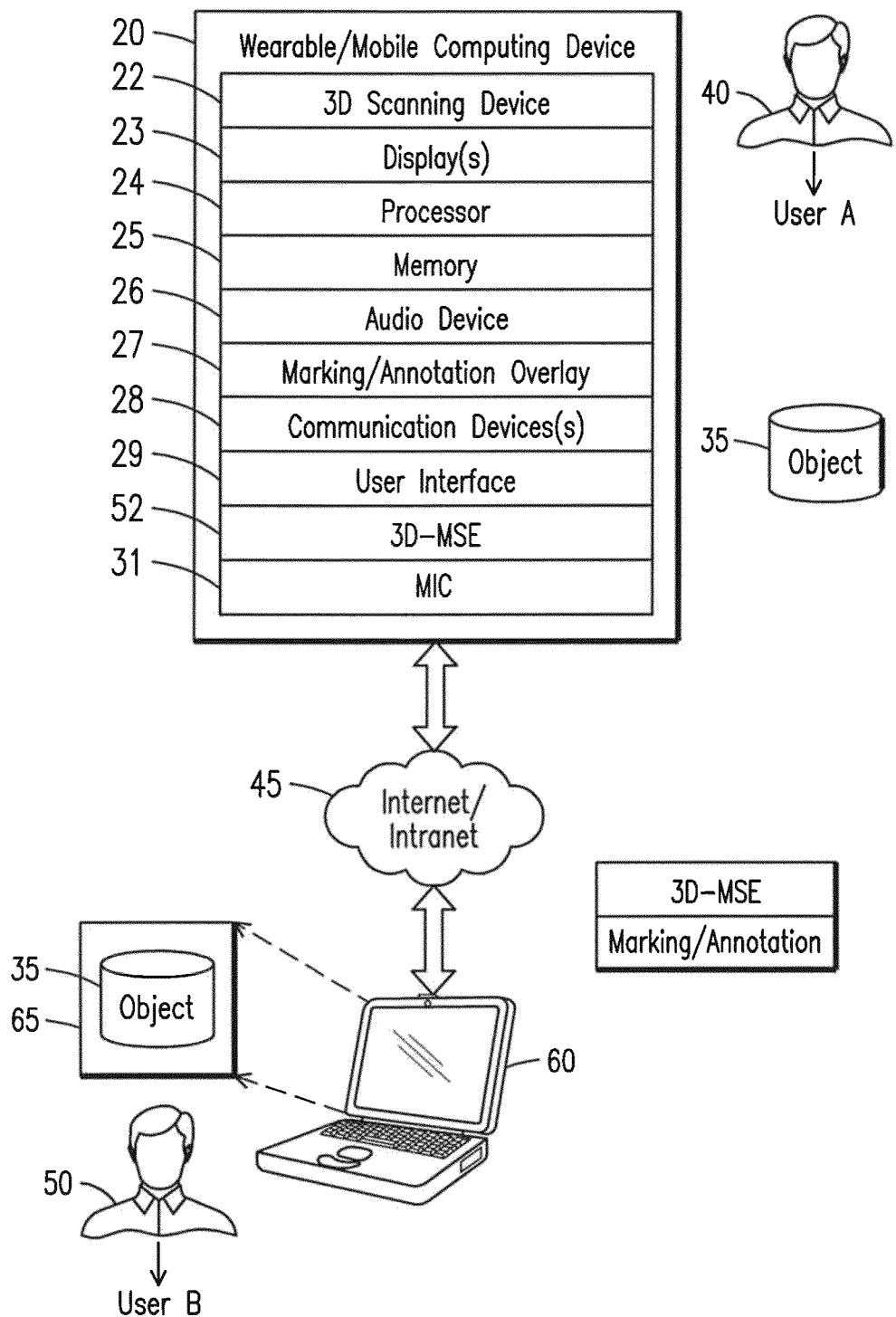
FIG. 5 shows a block diagram of an HWD remote assistant system for network-based collaboration, training and/or maintenance in accordance with an embodiment.

FIG. 5 illustrates a block diagram of an HWD remote assistant system for network-based collaboration, training and/or maintenance in accordance with an embodiment. At a first location, User A 40 uses a wearable/mobile computing device 20. With the device 20, User A scans an object 35 or scene using a 3D scanning device 22 and collects the scene data. The captured 3D model may be communicated to a second location, such as over a network 45, to a computing device 60, or processor. In an embodiment, the captured 3D model of the object 35 may be communicated to a user B 50. The captured 3D model 65 may be received by the computing device 60 and displayed to the user B 50 via the display of the computing device 60. The computing device 60 may be configured to mark or annotate the received 3D model. By way of non-limiting example, User B 50 may use a mouse, keyboard or other user interface to enter marking(s) or annotation(s) directly on the captured 3D model 65. For illustrative purposes, a "1" has been marked on a surface of the object 35. The computing device 60 may allow the user viewpoint of the 3D model to be manipulated (e.g., rotated or moved). The computing device 60 may allow the viewpoint of the 3D model to be Changed. By way of non-limiting example, the 3D model may appear smaller or larger when the viewpoint is changed. The marked or annotated 3D model may be communicated (Step 625) from the second location back to the first location through network 45.

The received marked or annotated 3D model may be received by the wearable/mobile computing device 20 and displayed on display 23. The mark(s) or annotation(s) may be fixed to the location on the image entered by the user B 50. By way of non-limiting example, the mark(s) or annotation(s) add a layer at a location entered on the image. Furthermore, the wearable/mobile computing device 20 may be configured to mark or annotate the 3D model, via marking/annotation module 27, before sending the 3D model to the User B 50. By way of non-limiting example, User A 40, using a user interface 29, enters a mark or annotation for the user B 50. The marking/annotation module 27 may allow the user to enter textual mark(s) over the 3D model. The marking/annotation module 27 may allow the user A 40 to enter textual annotations. The user B 50 may enter free-form markings on the surface of the objects, text relative to a point on the surface of an object, and pre-defined shapes relative to a point on the surface of an object. Additionally, as either the HWD device 100 or the object are moved, the computing system may maintain alignment of the mark or annotation at the fixed location on the object. Though not illustrated, alignment may be maintained with an alignment system or device, such as but not limited to inertial measurement unit (IMU).

Though one form of communication illustrated is via the Internet, communications between User A and User B may include one or more of cellular communications, satellite communications, mobile communications, Internet communications, Intranet communications, maritime communications, wireless communications, Wi-Fi communications and landline communications. The communications may include Voice Over Internet Protocol (VOIP) communications. As discussed above, during one or more of the steps voice/audio communications may take place simultaneously, in parallel or serially.

A location of User A is limitless. For example, the first location may be underwater, above water, on land, in an aircraft, in a boat, in a vehicle, etc. The collaboration platform may allow User A anywhere (first location) in the world on planet Earth or in outer space to communicate through wired communications, wireless communications or a combination of wired and wireless communications with User B at a second location different from the first location. Additionally, the communication does not have to be connection-based. In a non-limiting example, it may also be store-and-forward, such that User A may create a data package and send it to User B for later use by User B who may then return the updated package to User A.

The object being viewed is also limitless. For example, the object may be a vehicle, an aircraft, a boat, a man-made device, or a naturally-occurring object. In some instances, a maintenance manual would not be available to User A and User A could obtain repair or maintenance instructions from User B. By way of a non-limiting example, during a simulated military operation involving User B, User A may assist user B with an F-16 gun assembly/disassembly, or with the operation of other firearms, weapons, vehicles, military vehicle or equipment, training or maintenance.

As disclosed above, the 3D scanning device 22 may include a camera and a red, green, blue (RGB) depth sensing device 22. By way of a non-limiting example, the 3D scanning device 22 may include a camera; an infrared (IR) emitter which may emit a predefined pattern of IR signals; and an IR receiver/sensor configured to receive/sense the emitted IR signals to perceive depth of an object. The IR emitter and IR receiver/sensor may be used in-doors.

By way of non-limiting example, the wearable/mobile computing device 20 may be an HMD device where the display 23 may be mounted in the HMD device. The HMD device may include see-through lenses with augmented reality (AR) overlay capability.

The user interface 29 may be a mouse ring. The user interface 29 may accept voice commands for navigation, selection and control of one or more functions of the HMD device. The user interface 29 may include the tracking of a user's direction of gaze or eye movements. Other user interfaces may be used such as without limitation a wrist mounted pad, a mouth controlled user interface, or neurologically controlled user interface. The 3D scanning device 22 may include a camera mounted on the HMD device or may be separately mounted to or worn by the body of User A 40. User A 40 while viewing the object 35 through the see-through lenses may take one or more images of the object 35 and walk around the object 35 while capturing additional 3D images. A 3D image of the object 35 may be communicated to the user B 50 or a 3D model from a plurality of images may be formed.

Figure 6:
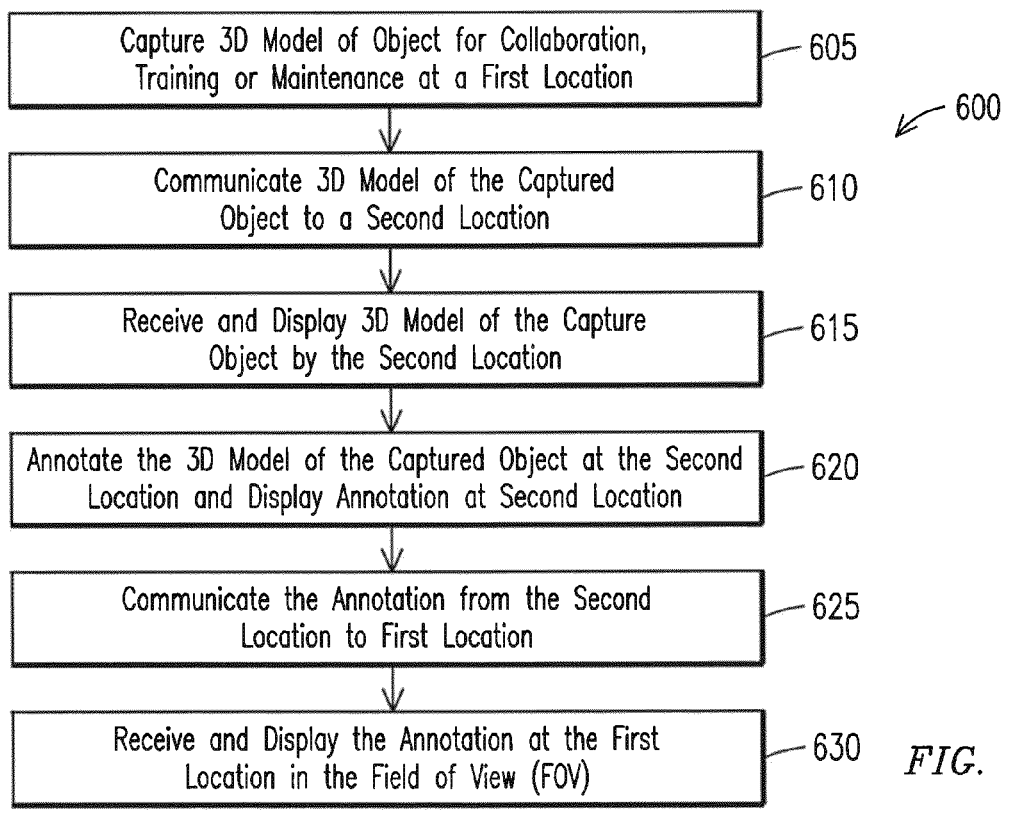
FIG. 6 shows a flowchart of a method of an embodiment.

FIG. 6 illustrates a flow chart illustrating a method of an embodiment. The method may include the steps of capturing a 3D model of an object at a first location, at 605, communicating the 3D model to a second location, at 610, displaying the received 3D model of the captured object at the second location, 615. The method may further include the step of annotating the 3D model of the captured object at the second location. The annotation may be viewable at the second location. The method may further include the steps of communicating the annotation from the second location to the first location, at 625, and receiving and displaying the annotation on the object at the first location, at 630.

The instantaneous depth measurements may be captured and used by User A as well. The depth measurements are also transmitted to the MSE. Both computers, at User A and User B, may use the same algorithms to convert the depth data into 3D surfaces. The audio data may be transmitted bi (and/or uni)-directionally from both locations where equipment at both ends may act as a client and/or server. Similarly, depth and color data may be transmitted uni-directionally from the sensor 22 to the second location, User B. Also, annotation, or marking, data may be transmitted uni-directionally from the sensor 22 to the second location, User B.

In an embodiment, the device 100 may have a see-through configuration. In an embodiment, the HWD 100 may have a video see-through configuration. In an embodiment, the HWD device 100 may be configured with a Binocular Display configuration. In an embodiment, at User B Station, the computing device may be configured to 1) perform Point Cloud Re-construction, 2) perform Surface Prediction, and 3) display fused/polygonized Point Cloud. At the computing device of user B, the computing device may perform Hotspot Annotation as entered by the user and insertion of the annotation relative to Point Cloud View.

The HMD device allows the user's hands to be free for holding and/or manipulating the object. In one embodiment, the user of the HMD device does not require technical training manuals. The user B may provide the instructions during collaboration to learn how to use and operate the object. In one embodiment, the user of the HMD device does not require technical maintenance manuals. The user B may provide the instructions during collaboration to repair or fix the object. In one embodiment, the HMD device allows for instantaneous collaboration between two people using a 3D model. The HMD device may be configured to use wireless communications using one or more communications protocols.

Figure 8:
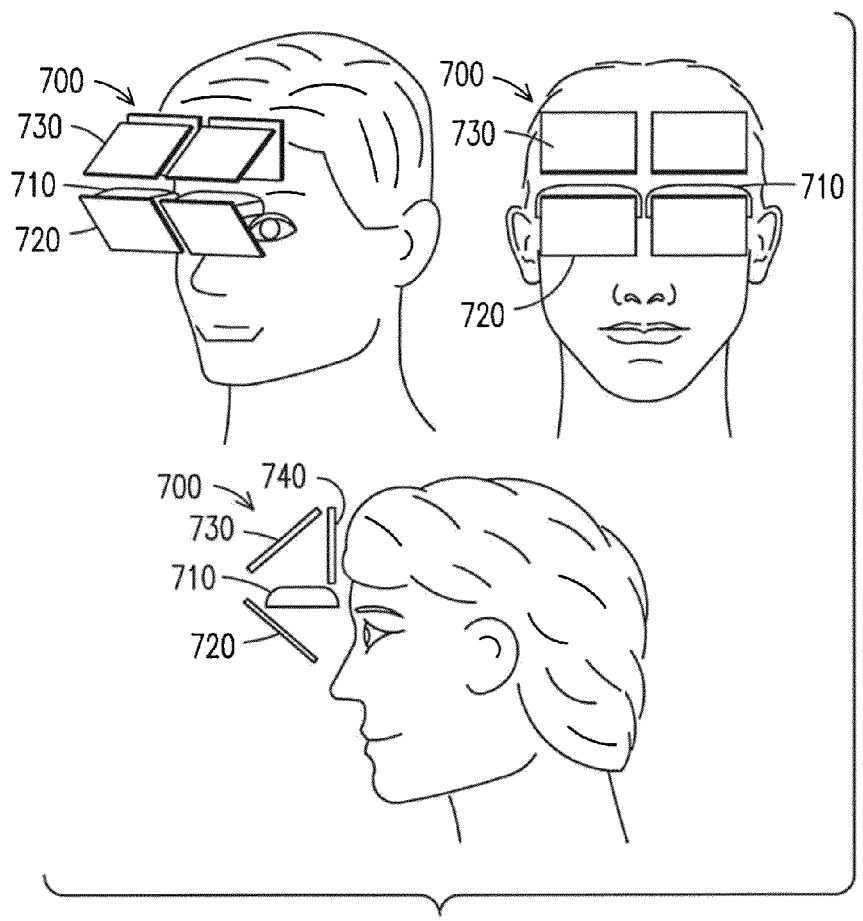
FIG. 8 shows a graphic representation of a curved lens HWD optics.
Figure 7:
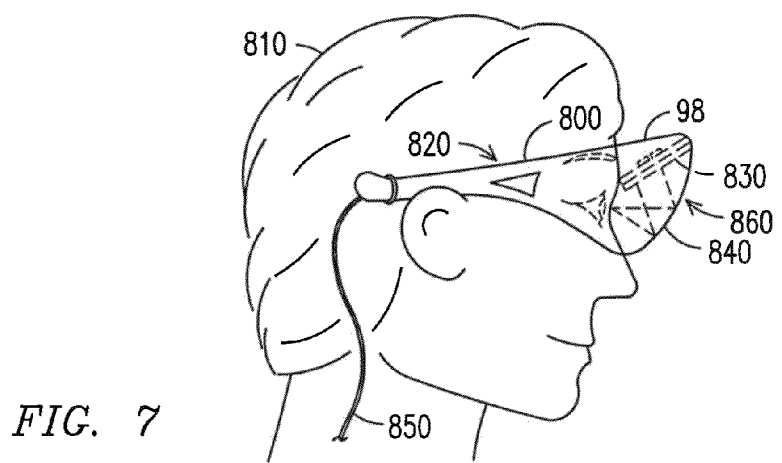
FIG. 7 shows a graphic representation of a Flat Lens HWD optics.

The HWD device 100 may include optics 700 for a Flat Lens Head Wearable Device (FLHWD), as illustrated in FIG. 7, configured to overlay virtual images in the real world as seen by the human eye through a see-through flat lens. As illustrated, a frame is not disclosed in FIG. 7. In an embodiment, the HWD device 100 may be configured as having optics for a Curved Lens Head Wearable Display (CLHWD) device 800, as illustrated in FIG. 8, configured to overlay virtual images in the real world as seen by the human eye through a see-through curved lens.

Referring back to FIG. 7, the optics system of the HWD device 100 may include Fresnel lenses 710, a beam splitter 720, and a mirror 730. The optics system 700 may be configured to produce an image in front of the forehead and allows the wearer to observe it as if the image were a few feet or a few miles in the field of view. The optics system 700 may be configured to be mechanically adjustable to allow the user to correct the focal length of the overlaid image to the desired distance depending on the application. FIG. 7 actually depicts an optics layout from different views with respect to a display 740 where the beam splitter 720, Fresnel lenses 710, and the mirror 730 are visible.

The Fresnel lenses 710 may include a system of spherically curved lenses which provide the optical power in the system required to make the image appear yards or even miles away. Making the distance between the Fresnel lenses 710 and the display 740 adjustable may allow the user to vary the focal length of the overlaid image. Whereas the beam splitter 720 may be placed directly in front of the user's eye at a 45 degree angle. This component allows the user both to see through the beam splitter 720 into the real world and also bend the virtual image from the display 740 into the user's eye. The mirror 730 may be placed at a 45 degree angle in front of the display 740 in order to reflect the image downward toward the Fresnel lenses 710.

Referring back to FIG. 8, the optic of the CLHWD 800 may be integrated with other components to provide the augmented reality capability. The CLHWD 800 may include a frame 810 adapted to be mounted on a user's head 820, an image display 830 supported by the frame 810 (e.g., the frame supports the image display at a fixed location which, during use of the CLHWD, may be outside of the user's field of view); a free-space, ultra-wide angle, reflective optical surface 840 supported by the frame 810 serves as a curved beam splitter lens, and a wire 850 which connects to the wearable computing system 20 (if the computing system 20 is not a part of the HWD device) that drives the entire system. A camera 98 is also disclosed.

The optics system may be configured with the image display 830, and the curved beam splitter lens 860 which produces an AR image in front of the forehead and allows the user to observe it as if the AR image were a few feet or a few miles in the field of view. There may be one curved beam splitter lens 860 (curved lens) per eye. The curved lens may be partially reflective such that it may allow the user to see through the beam splitter into the real world and, simultaneously, provide a virtual AR image from the display to be reflected into the user's sight.

The curvature of the curved lens may be created through an iterative artificial intelligence program that adapts the surface to produce the image in the correct locations and to collimate the light such that the user may focus on it in such close proximity to the display. The image appears to be at some distance that may be set when the lens may be created. It may be changeable with movement of the display, but the quality of this resulting image has yet to be determined. It may be also possible to install a progressive-type of adjustment into the lens such that if the user looks down the virtual items are set to a closer focus, while looking up or straight ahead then the virtual items appear at a greater distance from the user.

Figure 9:
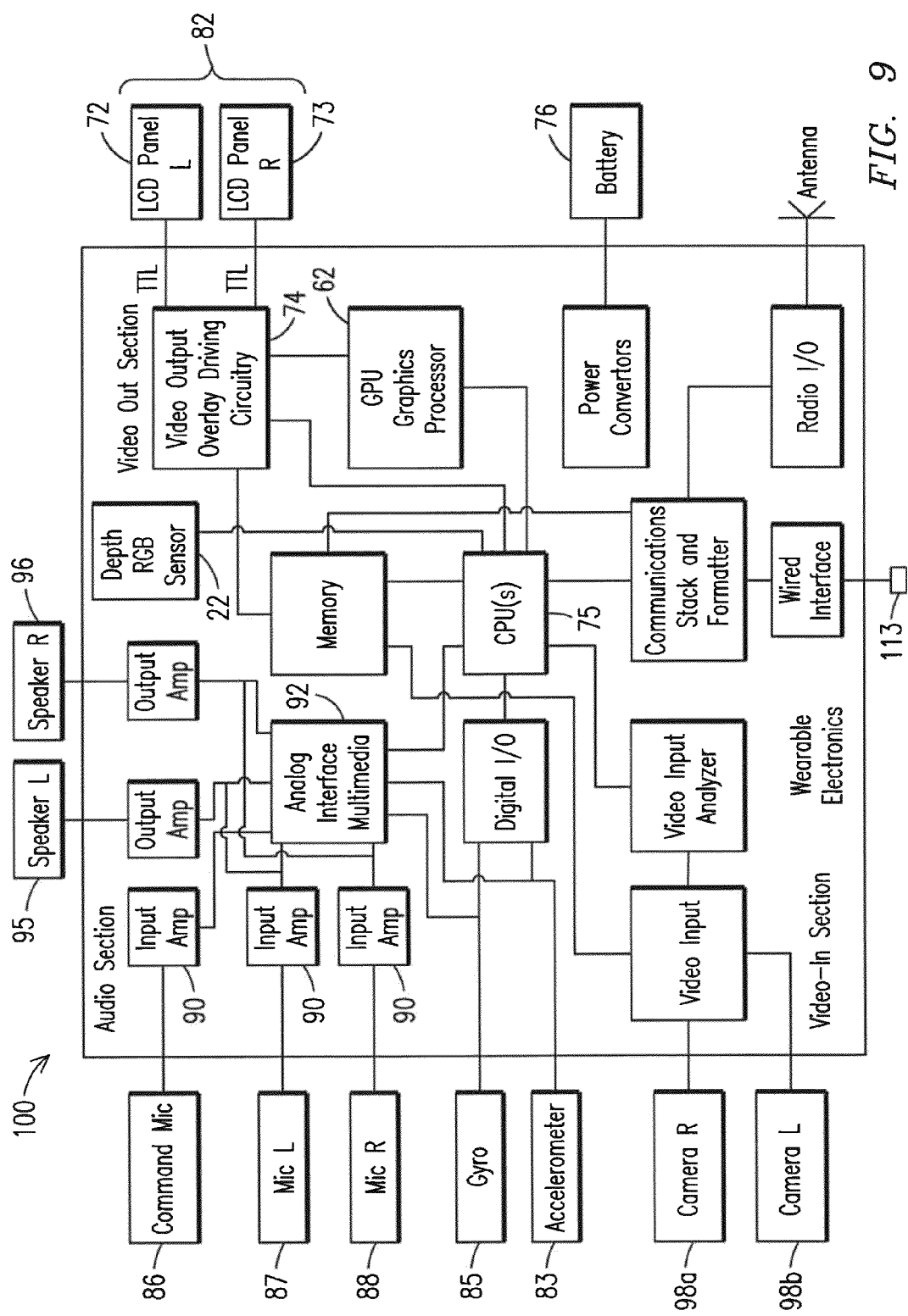
FIG. 9 shows a block diagram of electronics of an HWD device.

FIG. 9 discloses a block diagram illustrating a block diagram of exemplary electronic components of the HWD device. The HWD device 100 may comprise a plurality of hardware component subsystems such as, but not limited to, an optics system (as disclosed with respect to FIGS. 7 and 8), a display 82 and video driver system 74, an inertial navigation and head tracking system, an image recognition system, a communication system, a computing system 75, and a power system 76.

An accelerometer 83 may be configured as part of the HWD device 160 to measure translational motion in all three directions and sends this data to the computing system, tablet computing system or mobile/wireless computing system. A gyroscope 85 may also be a part of the HWD device 160 and configured to measure rotational motion in all three directions and sends this data to the computing system, tablet computing system or mobile/wireless computing system. Another part of the HWD device 160 may be an inertial navigation unit which may be configured to track the motion of head, allowing it to be positioned in both a global and relative coordinate system. Software may perform integration of user position with the other software components.

An image recognition system (video input analyzer) may be configured to recognize real world images and processing them so that the HWD device 100 may be aware of the current state. In one embodiment, the image recognition system may include a camera 98 which may be positioned in between the eyes of wearer of the HWD device 100. In another embodiment, cameras 98a, 98b are positioned on sides of the HWD device 100. In an embodiment, the video may be communicated to the computing system 20. In an embodiment, the image recognition system may include a computer vision module.

Another component on the HWD device 100 may be a communication system, 86, 87, 88, 90, 92, 95, 96, such as, but not limited to, an audible communication system. The communication system may allow the user to interact with the HWD device 100 verbally using voice commands. The HWD device 100 may include one or more microphones 87, 88. The one or more microphones 87, 88 may be coupled to input amplifiers 90. The amplifiers 90 may be connected to an analog interface 92 for multimedia inputs/outputs. The one or more microphones 87, 88 may record any sound made by the user or the environment into the computing system 110, which may use voice recognition software.

There may be a stereo pair of speakers 95, 96 for ambient environment replication. This may permit the user to have the wide sound-scape for more realistic augmented reality replication of the environment, similar to how the wide field of view helps provide a more realistic and useful optically augmented environment. There may also be need for an additional command microphone 86 if the stereo pair 87, 88 was unable to clearly capture the user's voice. The user may be able to listen to messages coming from the HWD device 100. The speakers 95, 96 may be stereo speakers and may be coupled to amplifiers with volume control. The one or more speakers may also provide ambient noise environment re-creation, noise cancellation, and augmented sound-scapes including spoken words from virtual participants. The HWD device 100 may include wireless communication interfaces for communicating wireless. Sound communicated to the HWD device 100 from a second perspective (a second HWD device or a camera) may be heard through the speakers 95, 96.

A computing system 75 may be configured to process and execute the software which inputs and outputs data to the rest of the system. The computing system 75 may receive data from the inertial navigation and head tracking system, the image recognition system, and the communication system. The computing system 75 may be pushing the video to the display 82 and video driver system 74 and also sound to the communication system. The computing system may also execute software configured to operate the HWD device 100. The computing system 75 may include a graphics processing unit (GPU) 62, one or more processors or central processing unit, digital input/output and non-transitory memory or computer readable medium.

A power system 76 may provide power to the display 82 and its drivers 74, camera, accelerometer 83, gyroscope 88, microphone 86, 87, 88, and speakers 95, 96. The power system 76 may include a battery pack which may be connected to all of the electronics of the HWD device 100. A battery pack may be used to drive some or all of the electronics in the HWD device 100. Individual power adapters may configure the power to the correct voltage and current ranges for the different devices integrated into the HWD device 100.

An interface socket 113 or input device may also be provided. The interface socket 113 may be used to allow the wearer to adjust or set functions on the HWD device 100. The interface socket 113 eventually communicates with the CPU 75. The depth/RGB sensor 22, or 3D scanning device, is disclosed. As disclosed above, the 3D model is captured by the depth/RGB sensor (or 3D scanner) 22.

The display and video driver system 74, 82 may be configured to project an image being pushed from the internal computing device 75, tablet computing system, or mobile/wireless computing system (not shown) into the optics system 72, 73 to be seen by the user. In one embodiment, the HWD device 100 may include one or more ultra-small, high resolution displays 72, 73 configured to be oriented vertically just in front of the user's forehead facing outward. As illustrated in FIG. 7, one display may be provided for the right eye and a second display for the left eye of the user. Though FIG. 8 is only a side view, if viewed from the front, a display for each eye would be viewable. The one or more displays 72, 73 may be connected to both by a connector board and an LED backlight inverter. Though not necessarily required, one or more displays may be expected to have a 2880×540 pixel layout, with each pixel having a 45 degree up/down/right/left viewable angle at a contrast ratio of 10. The size of the image measured diagonally may be 2 inches. The driver electronics 74 may be configured to supply RGB data in 8-bit bytes each, in parallel.

The connector board may be connected directly to the display via a short flex cable and uses a panel cable to connect to the converter board and an inverter extend cable to connect to the inverter board. It may be the medium for transferring data from the connector board to the display and powering the backlight of the display from the LED backlight inverter board. The LED backlight inverter 81 may be configured to connect the converter board with the connector board in order to power the backlight of the LED on the display. The connector board may serve as the backbone of the video driver system, inputting the video straight from a computing system, a tablet computing system or wireless/mobile computing system and outputting the data to the connector board and LED backlight inverter. The display controller may be configured as an interface for adjusting the parameters of the display 82 such as input, contrast, and brightness.

Based on the foregoing, the HWD device 100 may be configured to recognize real world objects, utilize integrated software database, and display high resolution images without requiring a user to view a video display from a camera. The HWD device 100 may be a hands free device configured to expand the possibilities of Augmented Reality.

Figure 10:
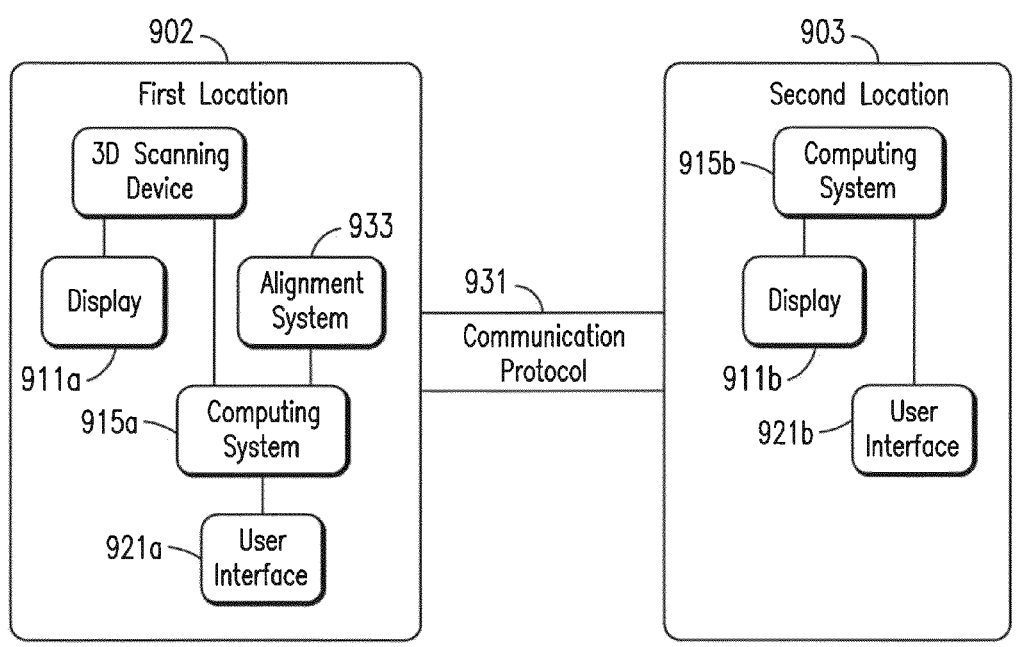
FIG. 10 shows a block diagram of an embodiment of a system.
Figure 11:
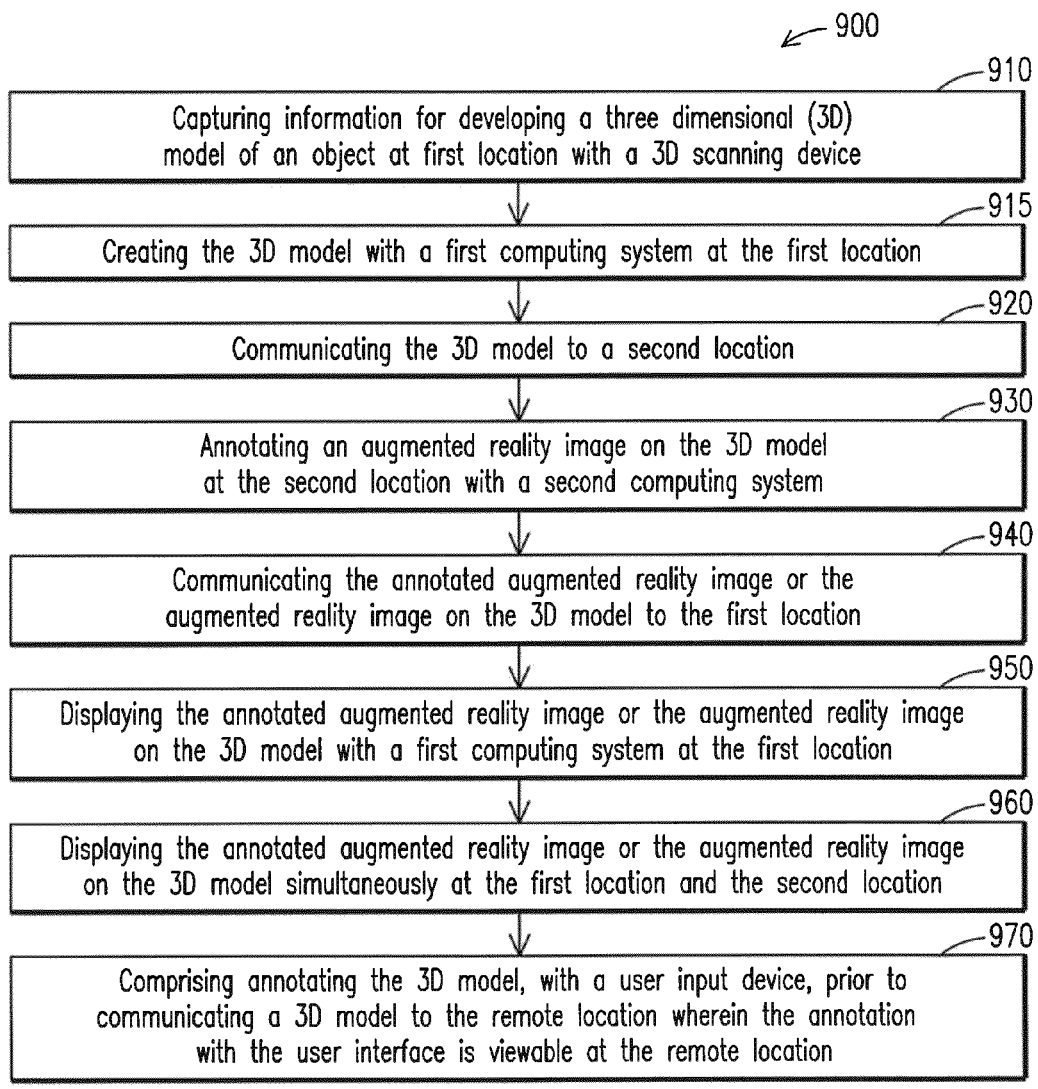
FIG. 11 shows a flowchart illustrating an embodiment of a method.

FIG. 10 shows a block diagram of an embodiment of a system. A first location 902 is provided. The 3D scanning device 22, display 911, computing system, and user input are also provided. The display 911a is provided to view the 3D model, annotation of a augmented reality image, or a annotation of the augmented reality image on the 3D model. A display 911b may also be provided at a second location 903. A computing system 915a, 915b is provided at the first location 902 and at the second location 903. A user interface may be provided at the first location 902 and at the second location 903. The user interface at the second location 903 may be provided to create an annotation of an augmented reality image on the 3D model captured at the first location and delivered to the second location 903 by way of a communication protocol 931. The user interface 921a at the first location 902 may be used to allow a user of the computing system 915a at the first location 902 to create a second annotation to the 3D model prior to communicating the 3D model to the second location 903, a second annotation to the annotated augmented reality image received from the second location 903, and/or a second annotation to the first annotation of the augmented reality image on the 3D model received from the second location 903. The annotation made with the user interface 921a at the first location 902 is viewable at the second location 903. The communication protocol 931 may also provide for audible communication. An alignment system 933 may also be provided to maintain alignment of the augmented reality image of the object with the real-world image of the object during movement or the display or an object viewed, such as, but not limited to, when the display is the HWD device.

In an embodiment, the 3D scanner 22 is a peripheral to the computing system. 915a, much as a computer mouse is a peripheral to a computer. The 3D scanner 22 uses the computing system 915a to assist with creation of the 3D model and to transmit the 3D model to the second location (to computing system 915b). Additionally, the 3D model may be edited with computing system 915a at the first location 902 prior to sending the 3D model to the second location (to computing system 915b).

FIG. 10 shows a flowchart illustrating an embodiment of a method. The method 900 comprises capturing information for developing a three dimensional (3D) model of an object at first location with a 3D scanning device, at 910, creating the 3D model with a first computing system at the first location, at 915, and communicating the 3D model to a second location, at 920. The method 900 also comprises annotating an augmented reality image on the 3D model at the second location with a second computing system, at 930. The method 900 also comprises communicating the annotated augmented reality image or the augmented reality image on the 3D model to the first location, at 940. The method 900 also comprises displaying the annotated augmented reality image or the augmented reality image on the 3D model with a second computing system at the first location, at 950.

The method 900 may further comprise displaying the annotated augmented reality image or the augmented reality image on the 3D model simultaneously at the first location and the second location, at 960. The method 900 may further comprise annotating the 3D model, with a user input device, prior to communicating a 3D model to the remote location wherein the annotation made with the user interface is viewable at the remote location, at 970.

The step of capturing a 3D model, at 910, may further comprise capturing the three dimensional (3D) model of an object in a real-world view with a head wearable display device. The step of displaying, at 950, may further comprise overlaying the annotated augmented reality image or the augmented reality image on the 3D model on a real-world view of the object. Annotating an augmented reality image, at 930, may comprise annotating a tool, a part, a text, a pre-defined shape, or a free-form markings as the augmented reality image.

When used with a computing device/display other than the HWD device as disclosed herein, the Augmented Reality information may be presented to User A as a Video-based AR, where the imagery provided by the created model is displayed with any annotations on a computer screen. This configuration may be used where the computing system is at a static location. The HWD system is useful when being used in a situation where the user may walk around to view an object from different locations. A mobile computing system, such as, but not limited to, a tablet device may also be useful User A is in a mobile situation.

Based on what has been disclosed above, persons skilled in the art will recognize that an apparatus, such as a data processing system, including a CPU, memory, I/O, program storage, a connecting bus, and other appropriate components, could be programmed or otherwise designed to facilitate the practice of embodiments of the method. Such a system would include appropriate program means for executing the method.

Also, an article of manufacture, such as a pre-recorded disk, computer readable media, or other similar computer program product, for use with a data processing system, could include a storage medium and program means recorded thereon for directing the data processing system to facilitate the practice of the method.

Embodiments may also be described in the general context of computer-executable instructions, such as program modules, being executed by any device such as, but not limited to, a computer, designed to accept data, perform prescribed mathematical and/or logical operations usually at high speed, where results of such operations may or may not be displayed. Generally, program modules include routines, programs, objects, components, data structures, etc., that perform particular tasks or implement particular abstract data types. For example, the software programs that underlie embodiments can be coded in different programming languages, for use with different devices, or platforms. It will be appreciated, however, that the principles that underlie the embodiments can be implemented with other types of computer software technologies.

Moreover, those skilled in the art will appreciate that embodiments may be practiced with other computer system configurations, multiprocessor systems, microprocessor-based or programmable consumer electronics, minicomputers, mainframe computers, and the like. Embodiments may also be practiced in distributed computing environments where tasks are performed by processing devices located at different locations that are linked through at least one communications network. In a distributed computing environment, program modules may be located in both local and remote computer storage media including memory storage devices. In view of the above, a non-transitory processor readable storage medium is provided. The storage medium comprises an executable computer program product which further comprises a computer software code that may be executed on a processor.

In view of the above, a non-transitory processor readable storage medium is provided. The storage medium may comprise an executable computer program product which further comprises a computer software code that, when executed on a processor, causes the processor to capture information for developing a three dimensional (3D) model of an object at first location with a 3D scanning device, create the 3D model with a first computing system at the first location, and communicate the 3D model to a second location. The processor is further caused to annotate an augmented reality image on the 3D model at the second location with a second computing system. The processor is further caused to communicate the annotated augmented reality image or the augmented reality image on the 3D model to the first location, and display the annotated augmented reality image or the augmented reality image on the 3D model with a the first computing system at the first location.

While various disclosed embodiments have been described above, it should be understood that they have been presented by way of example only, and not limitation. Numerous changes to the subject matter disclosed herein can be made in accordance with the embodiments disclosed herein without departing from the spirit or scope of the embodiments. In addition, while a particular feature may have been disclosed with respect to only one of several implementations, such feature may be combined with one or more other features of the other implementations as may be desired and advantageous for any given or particular application.

Thus, the breadth and scope of the subject matter provided herein should not be limited by any of the above explicitly described embodiments. Rather, the scope of the embodiments should be defined in accordance with the following claims and their equivalents.

The terminology used herein is for the purpose of describing particular embodiments only and is not intended to be limiting. As used herein, the singular forms "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to Which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Thus, while embodiments have been described with reference to various embodiments, it will be understood by those skilled in the art that various changes, omissions and/or additions may be made and equivalents may be substituted for elements thereof without departing from the spirit and scope of the embodiments. In addition, many modifications may be made to adapt a particular situation or material to the teachings of the embodiments without departing from the scope thereof. Therefore, it is intended that the embodiments not be limited to the particular embodiment disclosed as the best mode contemplated, but that all embodiments falling within the scope of the appended claims are considered.

What is claimed is:

1. A system comprising:
a three-dimensional (3D) scanning device, located at a first location, configured to scan a scene in a real world in a forward field-of-view of a first user and to generate sensor data associated with an object in the scene;
a first computing system, located at a second location;
a second computing system, located at the first location, configured to create a 3D model of the object based on the sensor data and to communicate the 3D model to the first computing system;
wherein the first computing system is configured to:
present imagery of the object to a second user based on the 3D model;
receive, via user input, an annotation associated with the object; and
communicate, to the second computing system, information that identifies the annotation;
wherein the second computing system is further configured to:
receive the information that identifies the annotation; and
present the annotation and a real-world view of the object to the first user.

2. The system according to claim 1, further comprising a display as part of the first computing system or the second computing system, the display being configured to view the annotation.

3. The system according to claim 2, wherein the second computing system or the display comprises a head wearable display (HWD) device.

4. The system according to claim 3, wherein the HWD device is configured to overlay the annotation on a display of the HWD device.

5. The system according to claim 1, wherein the second computing system is further configured to display the annotation or the annotation and the real-world view of the object on an internally-generated view of the 3D model on a display.

6. The system according to claim 1, wherein the second computing system further comprises a display configured for augmented reality overlay and viewing of the annotation and the real-world view of the object, with video-based augmented reality.

7. The system according to claim 1, wherein the annotation comprises an image of a tool, a part of the object, text, a pre-defined shape, or a free-form marking.

8. The system according to claim 1, wherein the second computing system further comprises a user interface.

9. The system according to claim 8, wherein the user interface is configured to allow the first user of the second computing system to create a second annotation to the 3D model prior to communicating the 3D model to the first computing system, a second annotation to the annotated augmented reality image received from the first computing system, or a second annotation to the first annotation of the augmented reality image on the 3D model received from the first computing system, wherein the second annotation made with the user interface is viewable at the first computing system.

10. The system according to claim 1, wherein the annotation is illustrated as a 3D rendering.

11. The system according to claim 1, further comprising an alignment system configured to maintain alignment of the augmented reality image of the object with the real-world image of the object during movement of the HWD device or the object.

12. The system according to claim 1, wherein the 3D scanning device further comprises a depth/Red-Green-Blue (RGB) sensor to perform depth and RGB sensing.

13. A method comprising:
scanning, with a three-dimensional (3D) scanning device, a scene in a real world in a forward field-of-view of a first user to generate sensor data associated with an object in the scene at a first location;
creating, by a first computing system at the first location, a 3D model of the object based on the sensor data;
communicating the 3D model to a second computing system at a second location;
presenting, by the second computing system, imagery of the object to a second user based on the 3D model;
receiving, by the second computing system, an annotation associated with the object at the second location;
communicating information that identifies the annotation to the first computing system; and
displaying the annotation and a real-world view of the object to the first user at the first location.

14. The method according to claim 13, wherein the step of scanning the scene further comprises scanning the scene with a head wearable display device.

15. The method according to claim 13, further comprising displaying the annotation simultaneously at the first location and the second location.

16. The method according to claim 13, wherein the annotation comprises a tool, a part, a text, a pre-defined shape, or free-form markings.

17. The method according to claim 13, further comprising annotating the 3D model, with a user input device, at the first location prior to communicating the 3D model to the second location, wherein the annotation made with the user interface is viewable at the second location.

18. A non-transitory processor readable storage medium, providing an executable computer program product, the executable computer program product comprising computer software code that, when executed by at least one processor, causes the at least one processor to:
scan, with a three-dimensional (3D) scanning device, a scene in a real world in a forward field-of-view of a first user to generate sensor data associated with an object in the scene at a first location;
create, by a first computing system at the first location, a 3D model of the object based on the sensor data;
communicate the 3D model to a second computing system at a second location;
present, by the second computing system, imagery of the object to a second user based on the 3D model;
receive, by the second computing system, an annotation associated with the object at the second location;
communicate information that identifies the annotation to the first computing system; and
display the annotation and a real-world view of the object to the first user at the first location.

* * * * *